INVENTOR.
J.C. GASCOIGNE
BY. Blair + Kilcoyne
ATTORNEY

Patented Dec. 21, 1943

2,337,322

UNITED STATES PATENT OFFICE 2,337,322

CUTTING TOOL HAVING TIP OR INSERT OF TUNGSTEN CARBIDE OR LIKE HARD MATERIALS

Joseph Colin Gascoigne, Heaton, Newcastle-on-Tyne, England

Application April 24, 1941, Serial No. 390,166
In Great Britain June 29, 1940

2 Claims. (Cl. 76—108)

Tungsten carbide and like tips or inserts are secured to the tool body by a process similar to brazing, an alloy known by the name "Sif Bronze" which is a registered trade-mark, being usually employed instead of spelter. This alloy is composed of 85% to 90% of copper, 5% to 10% of tin and the remainder zinc. It is found that this alloy adheres firmly to the tungsten carbide or the like, but not so firmly to the steel of the tool body. Consequently, failure frequently occurs at the bronze-steel interface, the tip with its firmly-adhering coating of bronze becoming detached from the tool body, whereas failure at the bronze-tungsten carbide interface is unknown.

According to this invention failure of this kind is avoided, or made less frequent, by forming the surface of the tool body which is to receive the tip of hard material with small closely-spaced depressions, such as those produced by a centre-punch. It is found that the bronze adheres tô a surface prepared in this way much more firmly than to a smooth surface, with the result that failure at the bronze-steel interface is no more frequent than failure at the bronze-tungsten carbide interface. This improved result is not obtained when the steel surface is grooved or knurled; it is essential that the original surface should be continuous, each depression being isolated from its neighbours. A knurled surface differs from this in that the depressions are continuous, being two series of grooves crossing one another, and the "lands" or high points are isolated from one another.

It is preferred to employ also a layer of fine steel wire gauze between the tip or insert and the surface on the tool body which receives it. It is found that this (and the same applies to the recessing of the steel surface) greatly facilitates the actual operation of "brazing," as the molten bronze is retained on the surface in a uniform layer instead of tending to collect in a globule or pool, which is apt to run off the surface. The use of wire gauze for this purpose is not new in itself, having been previously proposed for use in conjunction with smooth, un-recessed surfaces on the tool body.

Referring to the accompanying drawing—

Figures 2, 3:
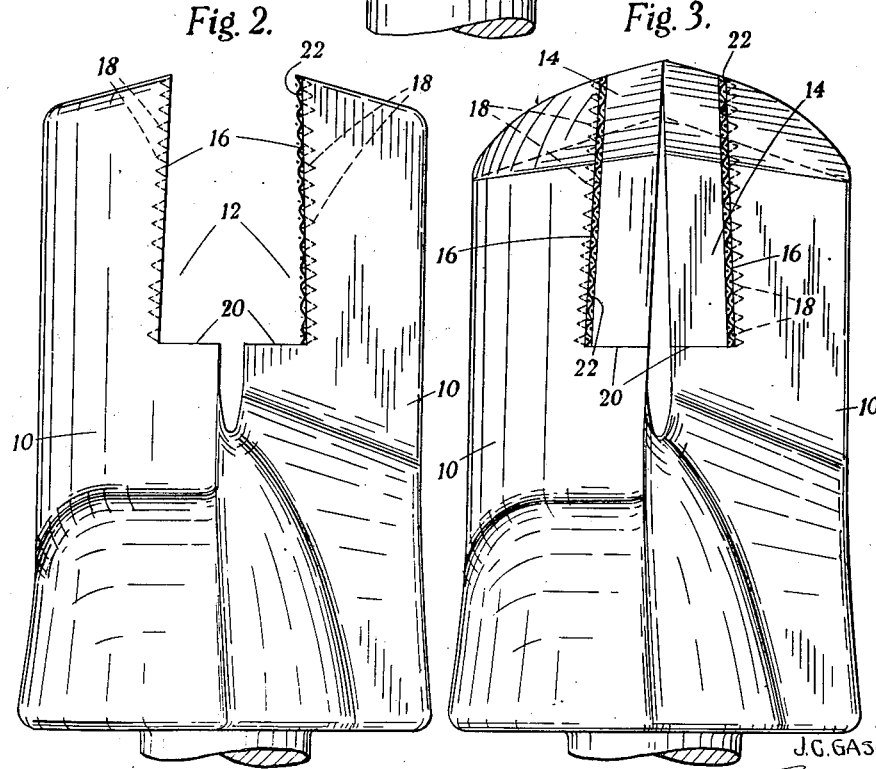
Figure 2 is a view as seen from the right in Figure 1.
Figure 3 is a view similar to Figure 2 showing the finished bit.

Each blade 10 of the drill blank is formed with a recess 12 for the reception of the tungsten carbide tip 14, Figure 3, and the surface 16 to which the tip is to be "brazed" is formed with a large number of small conical depressions 18, which may for example be made by means of a centre punch or in any other suitable way. When a centre punch is used, the raised rims that it produces around the depressions must be removed by filing or grinding so that the original surface between the depressions remains smooth and continuous. The depressions must be at least for the most part spaced apart so that each of them is isolated from the rest—that is to say, they must not be confluent.

The surface 16 and the other surface 20 of the recess, is now coated with bronze in the usual way, that is to say, by heating the whole of the blank to the correct temperature and applying flux and bronze. Next, a sheet of steel wire gauze or fine-mesh expanded metal 22 is applied and secured to the surface 16 by heating and applying flux and bronze. Another coating of bronze is added to the exposed surface of the wire gauze or expanded metal and finally the tip is applied and held firmly in position by a suitable clamp or hand press. The same operations are carried out on the other blade of the blank, the tip first applied being held in position by the clamp.

It is a valuable advantage of this invention that a clamp can be used for holding one of the tips in place while the second tip is being applied, without risk of squeezing out the whole of the molten bronze. Even if the steel wire gauze or expanded metal is not used, this squeezing out cannot occur because, as each small depression 18 is isolated from its neighbours, the small quantities of molten bronze lying in these recesses cannot escape when pressure is applied to the tip and any that does escape remains as a thin film between the continuous surface 16 and the surface of the tip. It is preferred to employ the intervening layer of steel wire gauze or expanded metal because this enhances the effect explained above.

Figure 1:
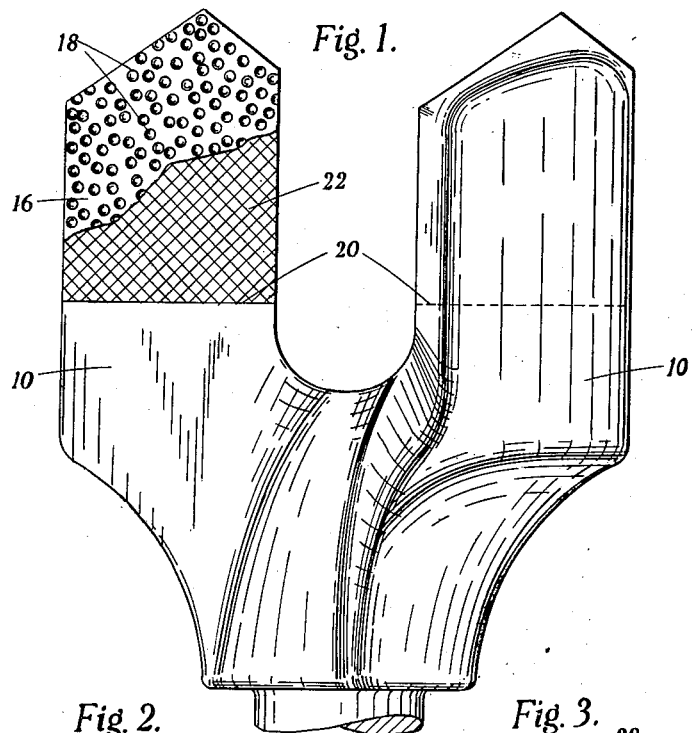
Figure 1 is a side elevation of a blank for a rock drill bit according to this invention.

In Figure 1 the extremities of the blades are shown square, but this is not the final shape, the finishing operation consists in grinding the ends of the blades to the same shape as the tip itself as shown in Figure 3.

Although a drill bit has been shown and described as an illustration, it is to be understood that the invention is equally applicable to other kinds of tool, such as coal-cutter picks and tools used for turning, boring and other operations on metals.

I claim:

1. The method of securing tungsten carbide and like tips or inserts to tool bodies, consisting in forming the surface of the tool body that is to receive the tip of hard material with small closely spaced but isolated depressions surrounded by portions of the said surface which are continuous with one another, heating the tool body and the tip or insert, applying a layer of a fusible brazing alloy to the aforesaid surface of the tool body to completely fill the said depressions with said fusible alloy, applying the tip or insert to the said surface and clamping it in position, and allowing the tool body and tip or insert to cool.

2. The method of securing tungsten carbide and like tips or inserts of hard material to tool bodies consisting in providing the tool body with a plain surface for receiving the tip of hard metal, forming in such plain surface a plurality of small closely spaced and isolated depressions separated from one another by portions of said plain surface which are continuous with one another, heating the tool body and the tip or insert, applying a layer of a fusible brazing alloy to the aforesaid surface of the tool body to completely fill the said depressions with said fusible alloy, applying the tip or insert to the said surface and clamping it in position, and allowing the tool body and tip or insert to cool.

JOSEPH COLIN GASCOIGNE.